(12) United States Patent
Merten et al.

(10) Patent No.: US 6,513,647 B1
(45) Date of Patent: *Feb. 4, 2003

(54) SCRAPER CHAIN FOR SCRAPER CHAIN CONVEYORS

(75) Inventors: Gerhard Merten, Lünen (DE); Hans Meya, Werne (DE)

(73) Assignee: DBT Deutsche Bergbau-Technik GmbH, Lunen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/590,245

(22) Filed: Jun. 8, 2000

Related U.S. Application Data

(63) Continuation of application No. 09/090,583, filed on Jun. 4, 1998.

(30) Foreign Application Priority Data

Jun. 11, 1997 (DE) .......................................... 197 24 586

(51) Int. Cl.[7] .............................................. B65G 19/08
(52) U.S. Cl. ..................................................... 198/733
(58) Field of Search ................................. 198/733, 731, 198/717, 725, 728, 730

(56) References Cited

U.S. PATENT DOCUMENTS

| | | |
|---|---|---|
| 4,867,300 A | 9/1989 | Braun et al. |
| 5,402,877 A | 4/1995 | Thiele et al. |

FOREIGN PATENT DOCUMENTS

| | | |
|---|---|---|
| DE | 3433715 | 4/1985 |
| DE | 32 34 137 | 11/1986 |
| DE | 37 04 176 | 5/1990 |
| GB | 2127127 | 4/1984 |

OTHER PUBLICATIONS

*Australia's Longwalls: DBT Spells Out Growth Plan*, Mar. 1998.
*World Coal: Exporting German Technology*, Sep. 1998.
*Mining Magazine: German Mining Technology*, Jun. 1999.

Primary Examiner—Khoi H. Tran
(74) Attorney, Agent, or Firm—Fay, Sharpe, Fagan, Minnich & McKee

(57) ABSTRACT

The invention relates to a scraper chain for scraper chain conveyors, particularly for use in mining, with vertical chain links flattened in their longitudinal legs, which are integrally joined by nose-parts of circular cross-section, while the horizontal chain links have a constant circular cross-section all round. The scraper chain has a strength which is at least equal to that of a size 48 standard round link chain. The horizontal links serving as scraper connection have a pitch which is at least 10%, and preferably about 15%, greater than the pitch of the vertical links. The outer width of the horizontal links is at least 30% greater than the outer width of the vertical links. For the scraper chain according to the invention, sprockets whose dimensions are the same as those for scraper chains of considerably lower strength may be used.

9 Claims, 2 Drawing Sheets

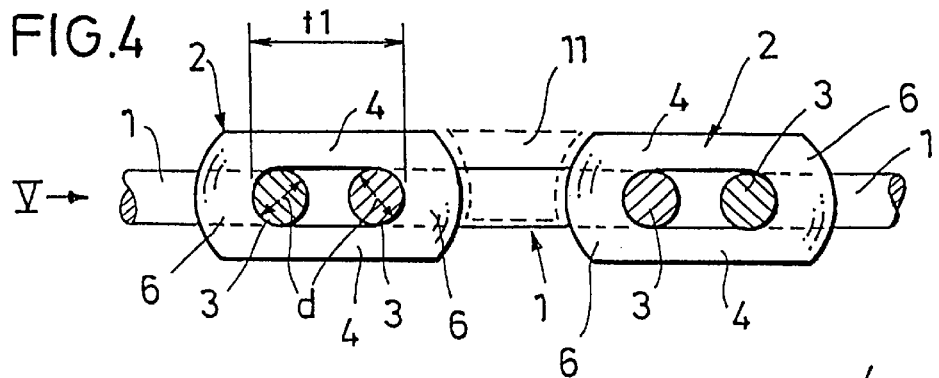
FIG.4
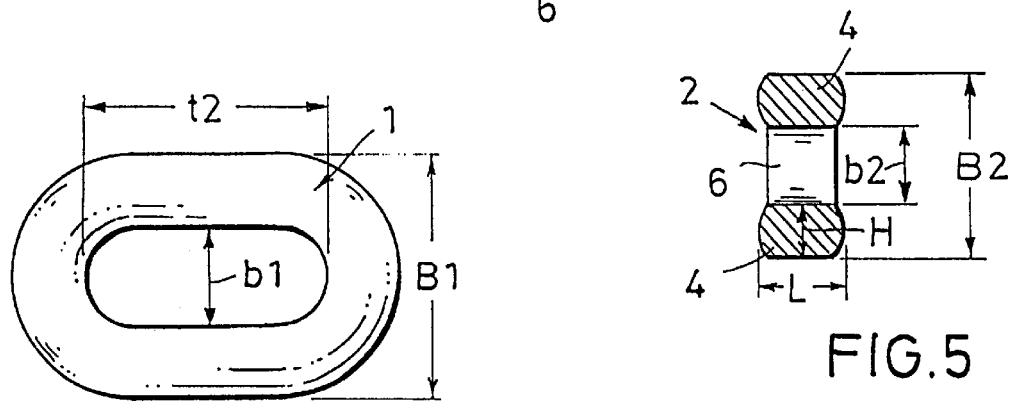
FIG.6
FIG.5
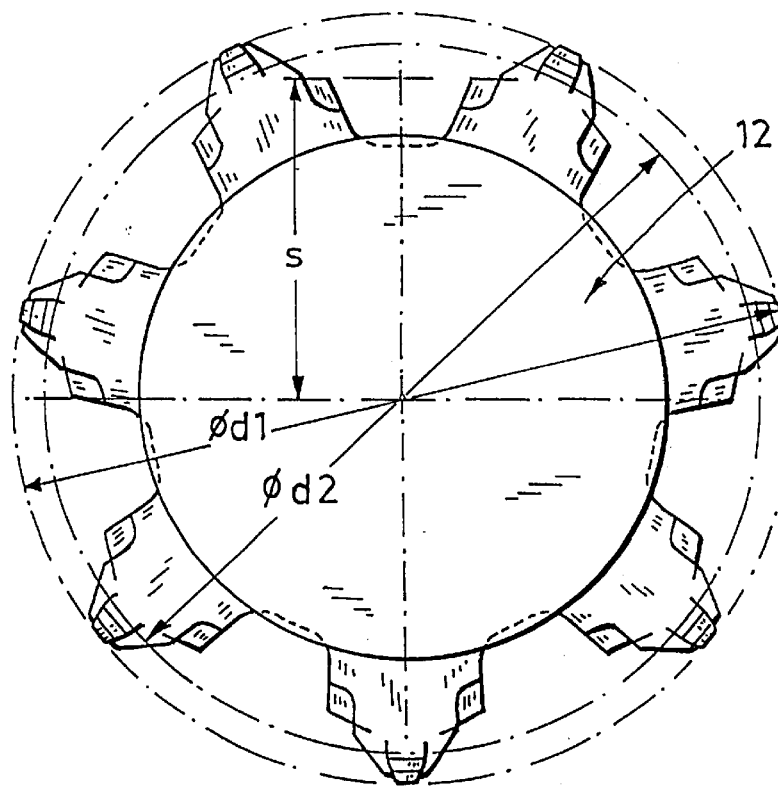
FIG.7

SCRAPER CHAIN FOR SCRAPER CHAIN CONVEYORS

This patent application is a continuation of application Ser. No. 09/090,583 filed on Jun. 4, 1998, which in turn claims priority on German Application Serial No. DE 197 24 586.2 filed Jun. 11, 1997 and is incorporated herein by reference.

FIELD OF THE INVENTION

The invention relates to a scraper chain for scraper chain conveyors, in particular for mining conveyors, and especially center chain or double center chain conveyors, with interlinking vertical and horizontal ring type chain links.

BACKGROUND OF THE INVENTION

Whereas round link chains of standardized patterns have been used in the past as scraper chains for the scraper chain conveyors used mainly in underground longwall workings in coal mines, a transition was made some time ago, in response to the ever-increasing performance requirements for these conveyors, to the use of special link chains for the scraper chains. The vertical links of these chains are made flat along their parallel longitudinal legs, so that the strength of the chain can be increased while keeping the height of the scraper chain low enough to enable it to be used on scraper chain conveyors commonly used in mining which are designed for lighter scraper chains. Such special scraper chains are described in DE 3234137 C2.

Based upon the abovementioned state of the art, DE 3704176 C2 has proposed a scraper chain in which the vertical links of the chain are likewise made with flattened legs to reduce the height of the chain, while links of the conventional type, that is links with a constant circular cross-section all round, are used for the horizontal links of the chain. The vertical links in this scraper chain have a smaller pitch than the horizontal links, but the combined pitch of one vertical link and one horizontal link is equal to the combined pitch of two standard links of smaller size, so that, in the example envisaged, it is possible to substitute a size 42 chain of this pattern for a size 38 round link chain of the standard pattern without having to modify the diameters of the head and tail sprockets.

SUMMARY OF THE INVENTION

The invention takes as its starting point the two above-mentioned publications, whose disclosures are subsumed into the description of the present invention. The principal object of the invention is to configure the scraper chain, formed as a link chain, of the stated kind in such a way as to optimize the scraper chain in terms of its overall dimensions and its carrying or pulling capacity whilst preserving the known advantageous features of the chain, and to enable the scraper chain to be used to advantage on scraper chain conveyors of very great conveying length, in particular on scraper chain conveyors for high-output longwall workings in underground mining.

The invention provides a scraper chain, formed as a link chain, for scraper chain conveyors which affords a very significant increase in pulling or carrying capacity over known scraper chains, while having particularly favorable overall dimensions, in particular a relatively low height, and in which moreover the horizontal links of the chain are designed in respect of their pitch, and hence also their other dimensions, so that a reliable connection can be made between them and the scrapers. The dimensional proportions of the link chain according to the invention are selected and optimized so that it can be used on scraper chain conveyors as a scraper chain with a carrying capacity or strength at least equal to that of a size 48 standard round link chain in which the horizontal and vertical links are of similar form and each have a constant circular cross-sectional all around, or even of a round link chain of higher carrying capacity.

Particularly, with regard to the strong and reliable connection of the scrapers, it is advantageous if the pitch of the horizontal chain links is greater by 15%±1% than the pitch of the vertical links, which approximately corresponds to three times the diameter of the circular cross-section of their curved bow parts ±5 mm. Particular design features of the scraper chain according to the invention are stated in claim 4 for the case where the scraper chain is adapted in its carrying capacity or strength to a size 48 standard round link chain.

A further advantage which can be gained with the invention is that the chain dimensions can be determined so that the head and tail sprockets for the scraper chain conveyor according to the invention have the same outer and/or reference diameter as sprockets for a size 42 standard round link chain; each sprocket is conveniently provided with seven teeth, as is known in itself.

BRIEF DESCRIPTION OF THE DRAWINGS

The invention will now be described in detail in relation to the preferred embodiment given by way of example and shown in the drawing, in which:

FIG. 4 is a side view of a portion of the scraper chain according to FIGS. 1–3, with the horizontal chain links shown in section;

FIG. 5 shows the curved bow part of a vertical chain link viewed in the direction of the arrow V of FIG. 4;

FIG. 6 is a top view of a single horizontal chain link of the scraper chain according to FIGS. 1–5; and FIG. 7 is a side view of a sprocket which can be used to advantage for the scraper chain according to the invention.

DETAILED DESCRIPTION OF THE INVENTION

For better comprehension reference is made to the publications cited above as state of the art. The illustrated scraper chain is, as is known, formed as a link chain, and consists of horizontal chain links 1 within which vertical (standing) chain links 2 are coupled. The horizontal links 1 are similar to the links of a round link chain of standardized pattern. Accordingly, they each have a constant circular cross-section 3 all round, with a diameter d (FIG. 4) at least equal to the diameter of a size 48 standard round link chain, that is at least 48 mm.

Figure 1:
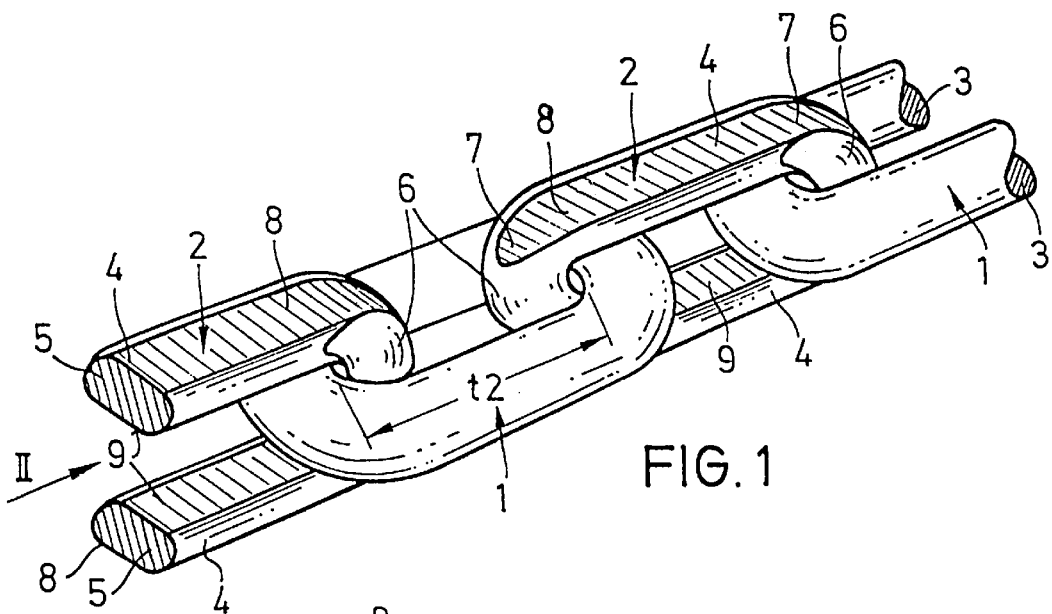
FIG. 1 is a perspective view of a portion of a scraper chain according to the invention.
Figure 2:
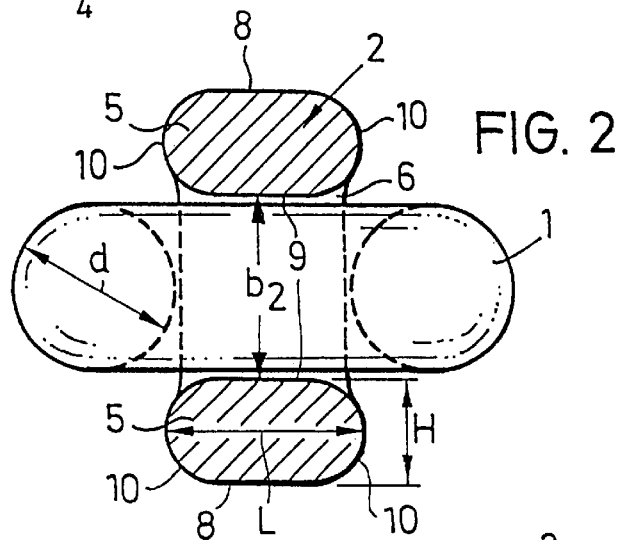
FIG. 2 shows a cross-section through the scraper chain viewed in the direction of the arrow II of FIG. 1.
Figure 3:
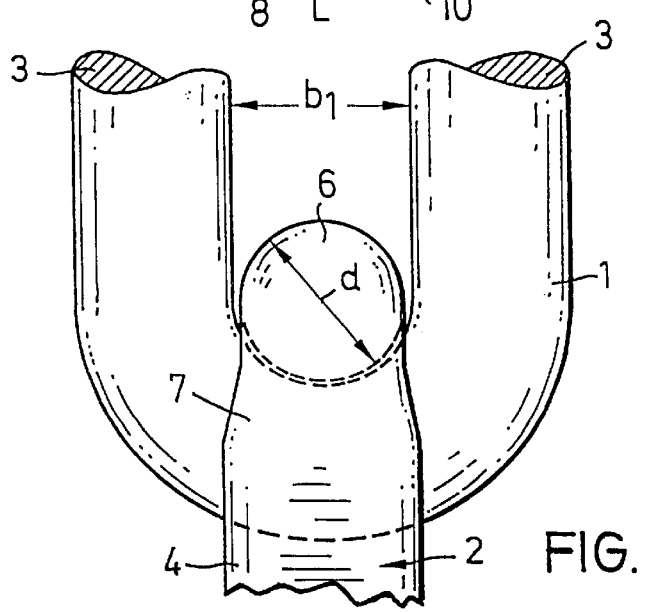
FIG. 3 is a partial top view of corresponding to FIG. 1.

The vertical links 2, which also consist of closed loops, have a cross-section 5 on their two parallel longitudinal legs 4 which is flattened in relation to the circular cross-section and is approximately oval in shape; and a circular cross-section in their curved bow parts 6 integrally linking the ends of the two longitudinal legs 4, as is revealed in particular by FIGS. 3 and 5. FIG. 3 shows, at 7, the zone of transition from the bow parts 6 of circular cross-section to the wider, flattened longitudinal legs 4.

The horizontal links 1 and the vertical links 2 are symmetrical about their respective longitudinal and transverse midplanes. The longitudinal legs 4 of the vertical links 2 which are flattened with respect to the circular cross-section have an approximately oval cross-section whose horizontal longitudinal axis has a length L which is considerably greater than the d of the circular cross-section 3 of the horizontal links 1. The vertical cross-sectional axis of the flattened section 5 of the two longitudinal legs 4, however, has a length H which is considerably smaller than the diameter d. Between the transition zones 7, the curved bow parts 6 of the vertical links 2 have a circular cross-section whose diameter d is preferably equal to the cross-sectional diameter d of the horizontal links 1 formed from round bar. Like the horizontal links 1, the vertical links 2 have an area of cross-section which is constant all round, and this area is approximately equal to that of the horizontal links 1.

In the scraper chain described above, the horizontal links 1 serving as attachment for the scraper have a pitch t2 which is at least 10% greater than the pitch t1 of the vertical links 2. A scraper 11 attached to a horizontal link of the link chain is shown in broken outline in FIG. 4. The design of the scrapers 11 and their attachment to the horizontal links 1 of the scraper chain can be of known type, so that detailed description is unnecessary. What matters is that the horizontal links 1, being larger in their pitch t2, and hence larger in the other dimensions dependent on the pitch, permit a secure and reliable connection of the scraper.

It should also be noted that the flattened, approximately oval cross-section of the longitudinal legs 4 of the vertical links 2 is bounded on the outside and on the inside by parallel flat surfaces 8 and 9 respectively, joined at both ends by curving rounded surfaces 10.

In FIG. 4, the outer width or height of the vertical links 2 is specified by the dimension B2, and in FIG. 6, the outer width of the horizontal links 1 is specified by the dimension B1. The outer width B1 of the horizontal links 1 is at least 30% greater than the outer width B2 of the vertical links 2.

Assuming the above described scraper chain to be designed to be equal in strength to a size 48 standard round link chain, the preferred dimensional relationships which result for the individual links 1 and 2 of the scraper chain are as follows: The pitch t2 of the horizontal links 1 is advantageously made about 15%±1% larger than the pitch t1 of the vertical links 2, preferably with the pitch t1 equal to 141 mm and the pitch t2 equal to 163 mm. The diameter d of the constant all-round circular cross-section of the horizontal links 1 is, as stated, 48 mm. The curved bow parts 6 of the vertical links 2 likewise have a circular cross-section of diameter d. The outer width B1 of the horizontal links is at least approximately 163 mm, while the outer width B2, that is the height of the vertical links 2, is 122 mm maximum. The width b1 of the oval internal opening of the horizontal links 1 is conveniently about 50 mm, while the width b2 of the likewise approximately oval internal opening of the vertical links 2 is conveniently about 52 mm.

Thus, with the abovementioned measurements and dimensional relationships a relatively low-profile scraper chain is realized, possessing the carrying capacity and/or strength of a size 48 standard round link chain, and optimized in its configuration and in its dimensional relationships so that it can be used in conjunction with a sprocket wheel 12 as shown in FIG. 7, with an outer diameter d1 and with a reference diameter d2, with these dimensions corresponding to those of a sprocket which can be used for the head and tail sprockets of a size 42 standard round link chain. Here the sprocket has seven teeth around its periphery. The tip circle diameter d1 is 758 mm, and the reference diameter d2 686 mm. The bedding dimension s is 302.2 mm.

In summary, a scraper chain is provided for scraper chain conveyors, in particular for mining conveyors, and especially center chain or double center chain conveyors, with interlinking vertical and horizontal ring type chain links, the horizontal chain links having a constant circular cross-section all round while the vertical links have a round cross-section in the curved bow parts connecting their longitudinal legs and a cross-section which is flattened with respect to the round section, and is approximately oval in form, in their parallel longitudinal legs, the horizontal cross-sectional axis of the flattened cross-section having a length (L) which is greater than the diameter (d) of the circular cross-section of the horizontal links and of the bow parts of the vertical links, while the vertical cross-sectional axis (H) of the said flattened cross-section (5) of the longitudinal legs of the vertical links has a length which is smaller than the diameter (d) of the circular cross-section of the horizontal links and of the bow parts of the vertical links, characterized by the following features:

a) the scraper chain has a strength at least equal to that of a size 48 standard round link chain.

b) the horizontal links (1) serving as scraper connection have a pitch (t2) which is at least 10% greater than the pitch (t1) of the vertical links (2).

c) the outer width (B1) of the horizontal links (1) is approximately 30% greater than the outer width (B2) of the vertical links (2). The scraper chain is also characterized in that the pitch (t2) of the horizontal link (1) is 15%±1% greater than the pitch (t1) of the vertical links (2). The scraper chain is further characterized in that the pitch (t1) of the vertical links (2) is approximately equal to three times the diameter of the circular cross-section (d) of their bow parts (6), ±5 mm. The scraper chain is also characterized in that in the case where the strength of the chain is matched to that of a size 48 standard round link chain the dimensions of the chain links (1, 2) are defined as follows:

Pitch (t2) of horizontal links 163 mm±2 mm;

Pitch (t1) of vertical links (2) 141 mm±22 mm;

Diameter (d) of circular cross-section of horizontal links (1) and of bow parts (6) of vertical links (2) 48 mm±1 mm;

Outer width (B1) of horizontal links (1) 163 mm maximum;

Outer width (B2) of vertical links (2) 122 mm maximum;

Ratio of cross-sectional axes (L/H) of flattened longitudinal legs (4) of vertical links (2) 58:34=1.7±0.1%. In particular, the sprocket (12) at the head and tail of the scraper chain has the same diameter values as the sprocket for a size 42 standard round link chain.

Having thus defined the invention, it is claimed:

1. A scraper chain for scraper chain conveyors comprising interlinked vertical and horizontal chain links;

each horizontal chain link having a constant cross-section all around the link, said constant cross-section being circular with a first diameter of substantially 48 mm;

each vertical chain link having a pair of opposed longitudinal limbs joined at their ends by curved nose-parts, said curved nose-parts having a round cross-section with a second diameter substantially equal to said first diameter, and said longitudinal limbs having a cross-section which is flattened with respect to said round cross-section and being approximately oval in form, said flattened cross-section having a width greater than said first and second diameters and a height smaller than said first and second diameters;

said scraper chain having a strength at least equal to that of a size 48 standard round link chain;

said horizontal chain links serving as scraper connection having a pitch which is at least 10% and no more than 16% greater than a pitch of said vertical links, said vertical chain links having a pitch which is approximately equal to three times said second diameter of said circular cross-section of said nose-parts of said vertical chain links; and said horizontal chain links having an outer width which is approximately 30% greater than an outer width of said vertical chain links.

2. The scraper chain of claim 1, wherein said cross-sectional area of said vertical link is the same as the cross-sectional area of a standard 48 mm chain.

3. The scraper chain of claim 1, wherein said vertical link is made from a 48 mm chain link.

4. A scraper chain according to claim 1, with a strength marched to that of a size 48 standard round link chain, wherein the dimensions of the chain links are defined as follows:

Pitch (t2) of horizontal links: 163 mm±2 mm;

Pitch (t1) of vertical links: 141 mm±2 mm;

Diameter (d) of circular cross-section of horizontal links and of nose-parts of vertical links 48 mm±1 mm;

Outer width (B1) of horizontal links: 163 mm maximum;

Outer width (B2) of vertical links: 122 mm maximum;

Ratio of dimensions of horizontal and vertical cross-sectional axes (L/H) of flattened longitudinal legs of vertical links: 58:34=1.7±0.1%.

5. A scraper chain according to claim 1, wherein said scraper chain has a spacing between consecutive links such that said scraper chain can be used with a sprocket at the head and tail of the scraper chain sized for a size 42 standard round link chain.

6. A scraper chain for longwall coal mining scraper chain conveyors having wheel driver suitable for size 42 standard round link chain comprising:

interlinked vertical and horizontal chain links;

each horizontal chain link having a constant cross-section all around the link, said constant cross-section being circular with a first diameter of substantially 48 mm;

each vertical chain link having a substantially constant cross-sectional area all around the link, said vertical chain link including a pair of opposed longitudinal limbs joined at their ends by curved nose-parts, said curved nose-parts having a constant round cross-section with a second diameter, and said longitudinal limbs having a cross-section which is flattened with respect to said round cross-section and being approximately oval in form, said flattened cross-section having a width greater than said first and second diameters and a height smaller than said first and second diameters;

said scraper chain having a strength at least equal to that of a size 48 standard round link chain;

said horizontal chain link serving as scraper connection having a pitch which is at least 10% and no more than 16% greater than a pitch of said vertical links, said vertical chain links having a pitch which is approximately equal to three times said second diameter of said circular cross-section of said nose-parts of said vertical chain links; and said horizontal chain links having an outer width which is approximately 30% greater than an outer width of said vertical chain links.

7. The scraper chain of claim 6, wherein said cross-sectional area of said vertical link is the same as the cross-sectional area of a standard 48 mm chain.

8. The scraper chain of claim 6, wherein said vertical link is made from a 48 mm chain link.

9. A scraper chain according to claim 6, wherein the dimensions of the chain links are defined as follows:

Pitch (t2) of horizontal links: 163 mm±2 mm;

Pitch (t1) of vertical links: 141 mm±2 mm;

Diameter (d) of circular cross-section of horizontal links and of nose-parts of vertical links 48 mm±1 mm;

Outer width (B1) of horizontal links: 163 mm maximum;

Outer width (B2) of vertical links: 122 mm maximum;

Ratio of dimensions of horizontal and vertical cross-sectional axes (L/H) of flattened longitudinal legs of vertical links: 58:34=1.7±0.1%.

* * * * *